US008453700B2

(12) United States Patent
Painter et al.

(10) Patent No.: US 8,453,700 B2
(45) Date of Patent: Jun. 4, 2013

(54) CONTINUOUS MOTION LABEL TRANSFERRING APPARATUS

(75) Inventors: Stephen Painter, Ajax (CA); Kevin Quinn, Toronto (CA)

(73) Assignee: PowerForward, Inc., Toronto, Ontario (CA)

( * ) Notice: Subject to any disclaimer, the term of this patent is extended or adjusted under 35 U.S.C. 154(b) by 473 days.

(21) Appl. No.: 11/919,967

(22) PCT Filed: May 4, 2006

(86) PCT No.: PCT/CA2006/000713

§ 371 (c)(1), (2), (4) Date: Feb. 15, 2008

(87) PCT Pub. No.: WO2006/130950

PCT Pub. Date: Dec. 14, 2006

(65) Prior Publication Data

US 2009/0090469 A1 Apr. 9, 2009

Related U.S. Application Data

(63) Continuation of application No. 11/123,940, filed on May 6, 2005, now abandoned.

(51) Int. Cl.

| | |
|---|---|
| ***B65C 9/02*** | (2006.01) |
| ***B65C 9/06*** | (2006.01) |
| ***B65C 9/18*** | (2006.01) |
| ***B65H 29/00*** | (2006.01) |
| ***B29C 65/48*** | (2006.01) |
| ***B32B 38/10*** | (2006.01) |
| ***B32B 37/02*** | (2006.01) |
| ***B32B 37/12*** | (2006.01) |
| ***B32B 37/20*** | (2006.01) |
| ***B32B 37/26*** | (2006.01) |
| *B65C 9/30* | (2006.01) |
| *B65C 9/42* | (2006.01) |
| *B65H 29/24* | (2006.01) |

(52) U.S. Cl.

USPC ............ 156/542; 156/541; 156/552; 156/556

(58) Field of Classification Search

USPC .................................................. 156/538–556

See application file for complete search history.

(56) References Cited

U.S. PATENT DOCUMENTS 3,321,105 A 5/1967 Marano
3,539,419 A * 11/1970 Stageberg .................... 156/540

(Continued)

OTHER PUBLICATIONS

Definition of “plate”, http://tinyurl.com/yfs592f.*

(Continued)

*Primary Examiner* — Sonya Mazumdar

(74) *Attorney, Agent, or Firm* — Greer, Burns & Crain, Ltd.

(57) ABSTRACT

Continuous motion label transferring apparatus includes a non-stick surface between a peel point and a pinch point. A label unwinder continuously passes a first web along a path towards the pinch point. The first web includes a series of spaced labels having pressure sensitive self-adhesive on a surface to which a liner of release material is releasably attached. As the release liner travels around the peel point, the labels continue to move toward the pinch point, passing over the nonstick surface as they approach the pinch point. A target mover passes a succession of spaced targets through the pinch point adjacent the self-adhesive surface of the labels, so that the labels are individually adhered to the targets. A control system for the label unwinder monitors the target mover, and synchronizes the labels and targets in a desired manner. The distance between the peel point and the pinch point is set so that the labels can be fed continuously into the pinch point in registration with the targets.

2 Claims, 5 Drawing Sheets

U.S. PATENT DOCUMENTS

| | | | | |
|---|---|---|---|---|
| 4,556,443 | A | 12/1985 | Moya | |
| 4,680,082 | A * | 7/1987 | Kearney | 156/497 |
| 4,687,535 | A | 8/1987 | Voltmer | |
| 4,840,694 | A | 6/1989 | Brookman et al. | |
| 5,225,022 | A | 7/1993 | Baker et al. | |
| 5,232,540 | A | 8/1993 | Southwell et al. | |
| 5,549,783 | A | 8/1996 | Schroeder et al. | |
| 5,642,666 | A | 7/1997 | Petteruti et al. | |
| 5,674,350 | A * | 10/1997 | Jurgich | 156/540 |
| 5,865,918 | A | 2/1999 | Franklin et al. | |
| 5,879,507 | A | 3/1999 | Schroeder et al. | |
| 5,885,406 | A | 3/1999 | Tiefel | |
| 5,888,343 | A | 3/1999 | Olson | |
| 6,412,535 | B1 | 7/2002 | Barilovits et al. | |
| 6,471,802 | B1 * | 10/2002 | Williamson | 156/64 |
| 6,558,490 | B2 | 5/2003 | Klein et al. | |
| 7,802,600 | B2 * | 9/2010 | Kobayashi | 156/387 |
| 2002/0040767 | A1 * | 4/2002 | Yang | 156/363 |
| 2002/0096264 | A1 * | 7/2002 | Yang | 156/556 |
| 2002/0100542 | A1 | 8/2002 | Traise | |
| 2003/0121607 | A1 | 7/2003 | Davis et al. | |
| 2005/0236112 | A1 * | 10/2005 | Barilovits et al. | 156/362 |
| 2007/0039684 | A1 * | 2/2007 | Nedblake | 156/249 |

OTHER PUBLICATIONS

Extended EP Search Report issued in App. No. 06761046.9 dated Jul. 11, 2011.

Longford OS700 Booklet Feeder, published in 2000.

* cited by examiner

CONTINUOUS MOTION LABEL TRANSFERRING APPARATUS

This application claims the right of priority based on U.S. Application Ser. No. 11/123,940, filed May 6, 2005, and PCT International Application No. PCT/CA2006/000713, filed May 4, 2006, which are hereby incorporated by reference in their entirety as if fully set forth herein.

This invention relates to label transferring apparatus, and more particularly, to apparatus that synchronizes the transfer of continuously moving labels from one moving web to spaced articles on another moving web or the like.

BACKGROUND OF THE INVENTION

Conventional label applicators unwind a web of pressure sensitive self-adhesive labels attached to a release liner. The labels are stiffer than the release material, so that when the release material is wound around a peel point of a peel bar, the labels are removed from the release liner as they pass the peel point. The leading edge of each label at the peel point extends away from the peel point and release liner, and is held in location until the next target arrives. The labels are then applied by air blast, mechanical tamping or the like. The targets can move continuously, but the labels are presented intermittently, in response to a trigger signal of some kind. This intermittent motion limits the rate and accuracy at which labels can be applied to targets.

Continuous motion lug conveyors have been used to apply adhesive-free booklets to base labels. Such lug conveyors can operate at a higher rates than comparable intermittent devices, but they are not used to apply pressure sensitive self-adhesive labels to targets. There is no efficient method of placing labels using such a lug conveyor because the adhesive makes the labels impractical to transport in such a mechanism. Thus, there is a need for pressure-sensitive self-adhesive label transferring apparatus that operates in a continuous manner, at a high rate, with a high degree of accuracy in the placement of the labels on the targets.

Accordingly, one object of this invention is to provide new and improved label transferring apparatus.

Another object is to provide new and improved apparatus that synchronizes the transfer of labels from one continuously moving web to spaced articles on another moving web or the like.

SUMMARY OF THE INVENTION

In keeping with one aspect of this invention, label transferring apparatus includes a non-stick surface between a peel point and a pinch point. A label unwinder continuously passes a first web along a path towards the pinch point. The first web includes a series of spaced labels, patches or the like having pressure sensitive self-adhesive on at least one surface to which a liner of release material is releasably attached.

Before the web reaches the pinch point, the release liner travels around the peel point. The labels continue to move toward the pinch point as the web passes the peel point. The self-adhesive surfaces of the labels pass over the nonstick surface as the labels approach the pinch point.

A target mover passes a succession of spaced targets through the pinch point adjacent the self-adhesive surface of the labels, so that the labels are individually adhered to the targets. The targets can be packages, other labels, printed areas or the like, on a web or a conveyor. A control system for the label unwinder monitors the target mover, and synchronizes the labels to the targets in a desired manner.

The distance between the peel point and the pinch point is selected so that the labels can be fed continuously into the pinch point in registration with the targets, irrespective of the relative speeds of the labels and targets.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which.

DETAILED DESCRIPTION

Figure 1:
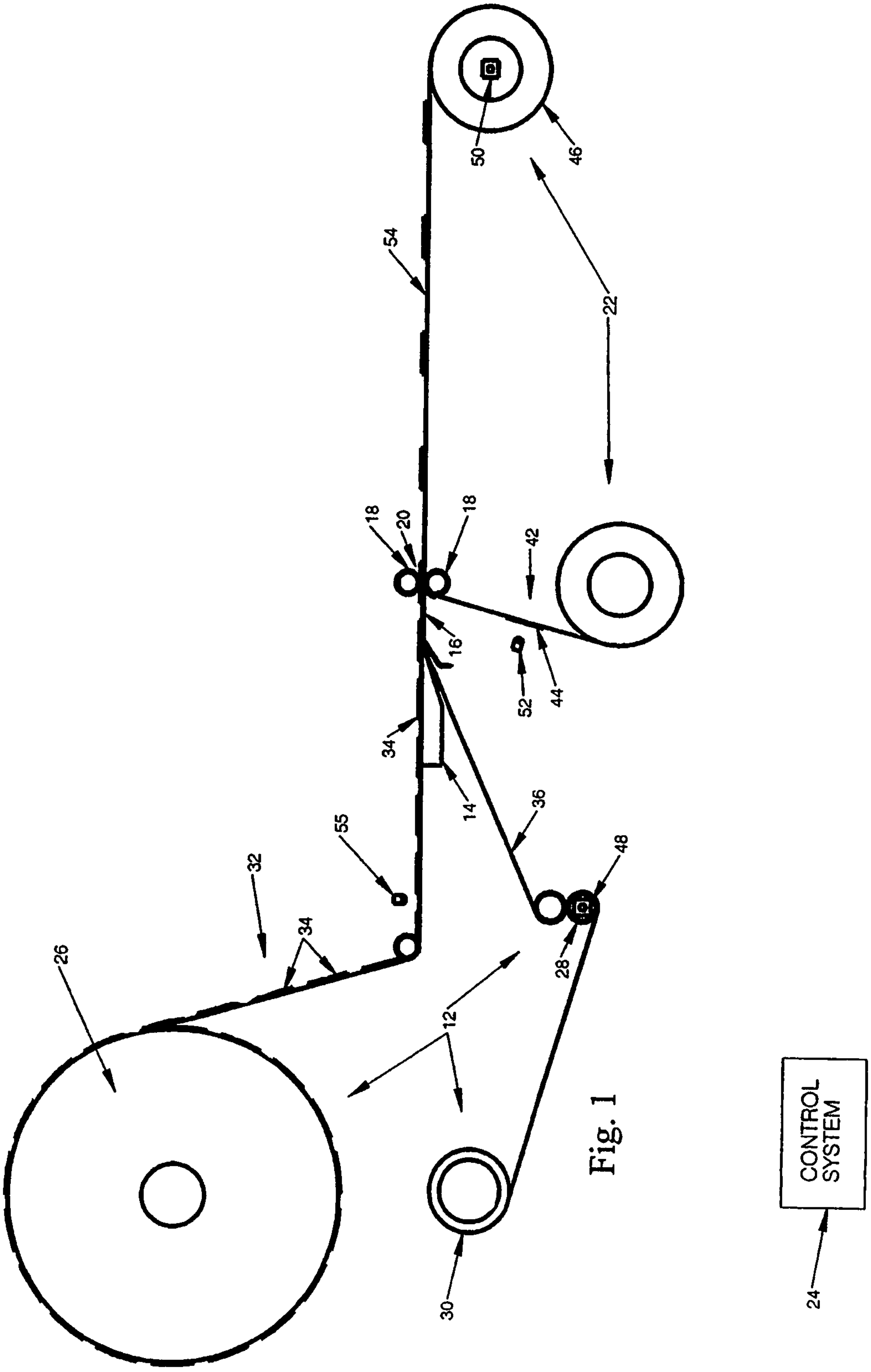
FIG. 1 is a block diagram of label transferring apparatus made in accordance with the present invention.
Figure 2:
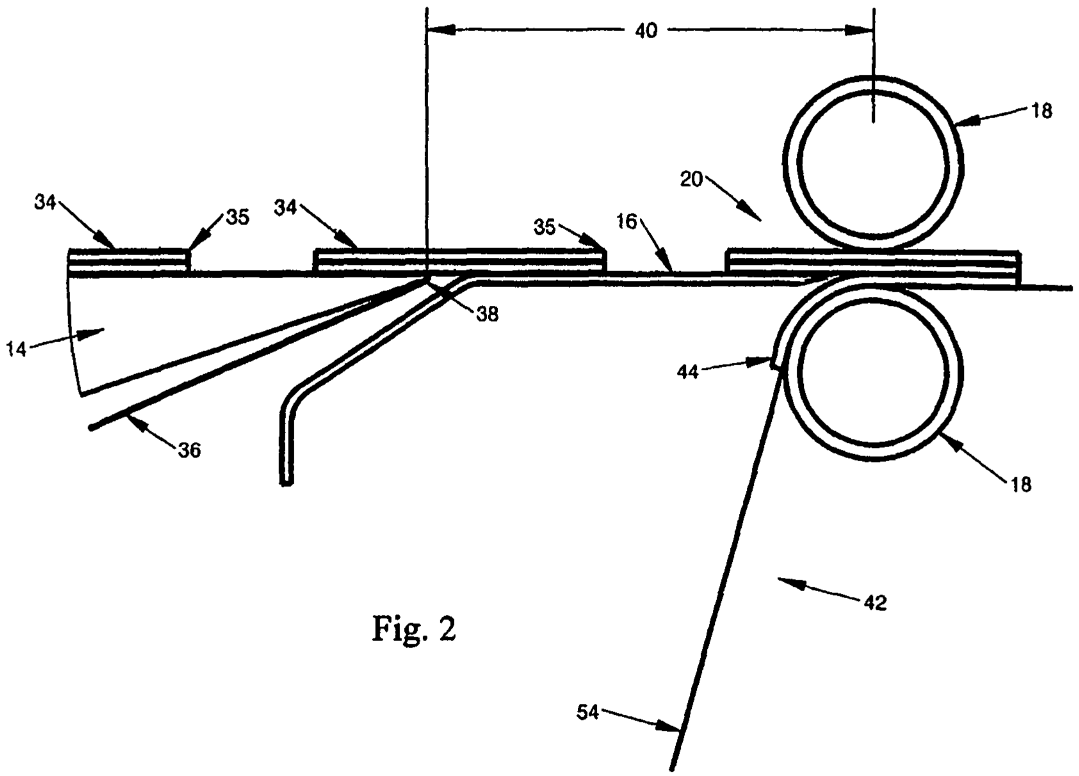
FIG. 2 is a diagram showing labels being applied to targets in the apparatus of FIG. 1.

Referring to FIGS. 1 and 2, label transferring apparatus 10 includes a label unwinder 12, a peel bar 14, a nonstick surface 16, pinch rollers 18 that form a pinch point 20, a target mover 22, and a control system 24. Multiple label unwinders could be used with a single target mover, if desired, to apply labels in a two-up or more fashion.

Figure 3:
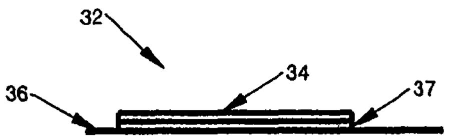
FIG. 3 is a diagram of a label before it is transferred to a target.

The label unwinder 12 has a supply reel 26, a drive system 28 which includes a motor, and a rewind reel 30. The label unwinder 12 continuously unwinds a web 32 (FIG. 3) of spaced labels 34 temporarily adhered to a liner of release material 36. The labels 34 have pressure sensitive adhesive 37 on at least the surface exposed to the liner 36. The labels 34 could also be adhered to the liner through static cling, heat-activated adhesive, releasable adhesive and the like.

The label unwinder 12 passes the web 32 along a path towards the pinch point 20 (FIG. 2). The peel bar 14 has a peel point 38 a suitable distance 40 from the pinch point 20.

The release liner 36 travels around the peel point 38 on the peel bar 14. As the liner passes the peel point 38, leading edges 35 of labels 34 continue to move toward the pinch point 20, because the labels are relatively stiff. As the labels leave the release liner 36, they pass onto the nonstick surface 16.

The adhesive sides 37 of the labels pass over the nonstick surface 16. The nonstick surface supports the labels as they leave the release liner, without significantly slowing or changing the speed of the labels, or bending or folding the labels. The nonstick surface 16 can be a plate, one or more wheels or any other suitable structure, some of which will be described. The surface can be coated with Teflon® (DuPont), or other suitable material, as needed, to have the desired non-stick qualities. The surface can be heated if heat-activated adhesive is used.

Figure 4:
FIG. 4. is a diagram of a label after it has been applied to a target using the apparatus of FIG. 1.
Figure 5:
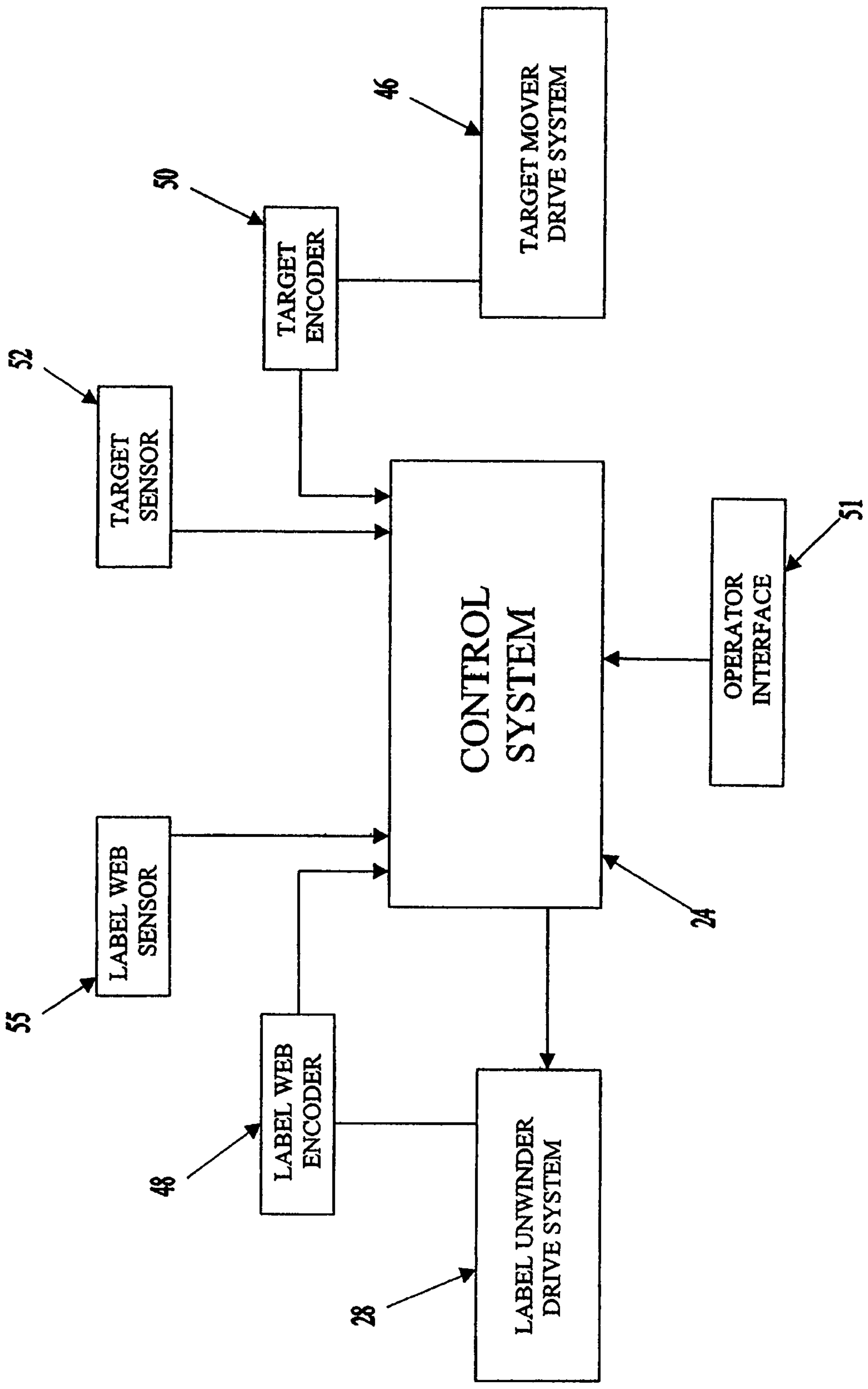
FIG. 5 is a block diagram of a control system used in the apparatus FIG. 1.

The target mover 22 passes a second web 42 through the pinch point 20, adjacent the self-adhesive surfaces 37 of the labels 34. The target mover 22 has a drive system 46. As the web 42 passes through the pinch point 20, the labels 34 are individually adhered to targets 44 on the second web 42 (FIG. 4). The targets 44 can be a printed area on the web, labels, bags or the like. The target mover 22 could be a lug conveyor or the like that moves the targets 44 in a predetermined manner without a web, as well.

The labels can take many forms, such as ordinary pressure-sensitive self-adhesive labels, folded labels, patches having pressure-sensitive self-adhesive on both sides, or the like. If the labels are patches and the upper adhesive surfaces of the labels are exposed when they pass between the pinch rollers 18, the top roller should have a non-stick surface coating.

The control system 24 controls label movement so that the labels are applied to the targets in a desired registration, by setting the speed of the drive system 28 and monitoring the speed and movement of the target mover. The speed and movement of the target mover 46 is measured with an encoder 50, and the control system 24 monitors the speed of label web 32 using an encoder 48. An operator sets unwinder 28 parameters using operator interface 51. Registration between the two webs is maintained using signals generated by sensor 52, which senses registration marks on the web 42 or the targets 54, and a sensor 55, which confirms presence and spacing of labels 34 on web 32.

Figure 6A:
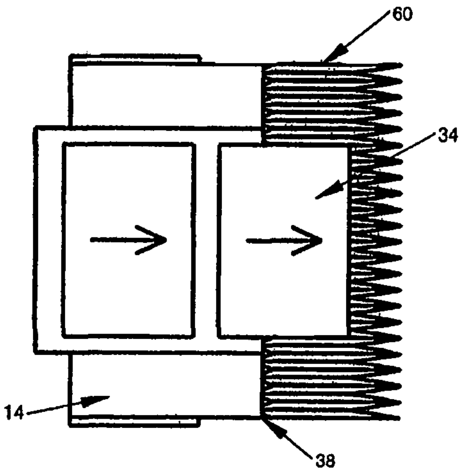
FIG. 6A is a plan view of one embodiment of a non-stick surface for the present invention.
Figure 6B:
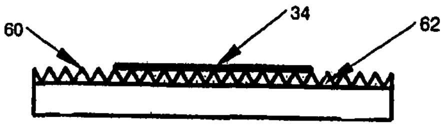
FIG. 6B is a front view of the non-stick surface of FIG. 6A.
Figure 7:
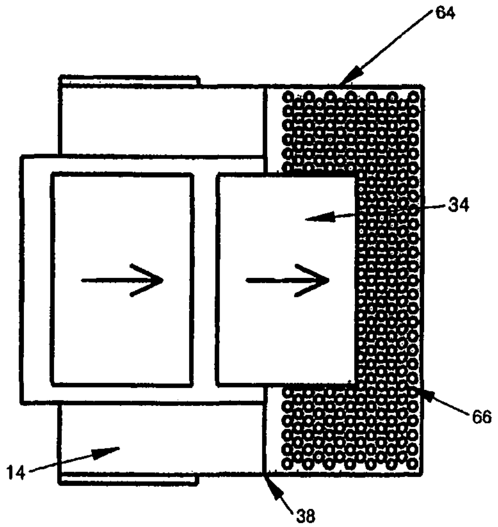
FIG. 7 is a plan view of another embodiment of a non-stick surface for the present invention.

The non-stick surface 16 can take many forms. In FIGS. 6A and 6B, for example, a non-stick surface 60 has a plurality of ridges 62 which form points over which the labels 34 pass. In FIG. 7, a non-stick surface 64 has a plurality of perforations 66, which further facilitate sliding of the labels 34 over the surface 64.

Figure 8A:
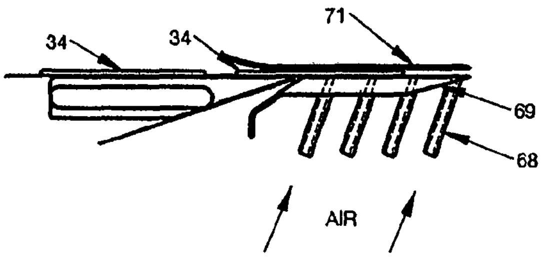
FIG. 8A is a side view of another alternate embodiment of a non-stick surface for the present invention, including a top plate.
Figure 8B:
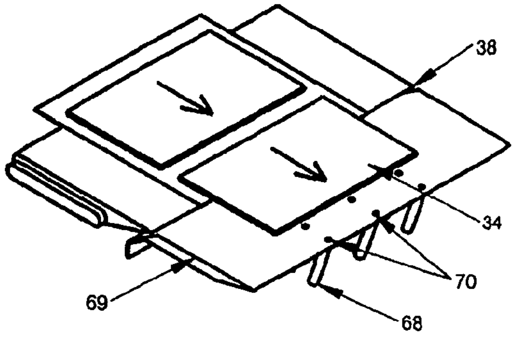
FIG. 8B is a perspective view of the non-stick surface of FIG. 8A, with the top plate removed.

In FIG. 8, a plurality of air nozzles 68 force air beneath the labels 34, easing their travel over a plate 69. The plate 69 has a plurality of orifices 70 which allow the pressurized air from the air sources 68 to pass through the plate, forcing pressurized air beneath the labels 34. A top plate 71 guides the labels 34, and prevents them from blowing away from the apparatus before they reach the pinch point.

Figure 9A:
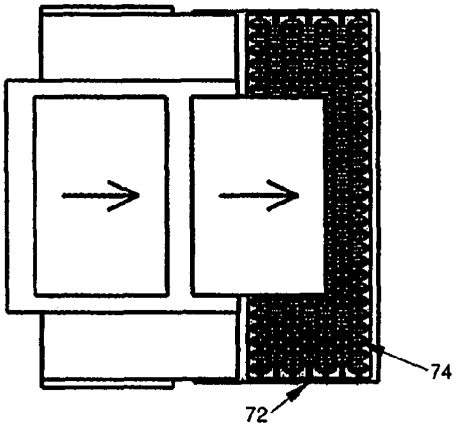
FIG. 9A is a plan view of another embodiment of the non-stick surface for the present invention.
Figure 9B:
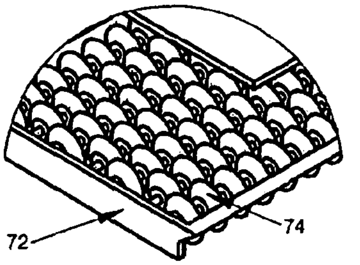
FIG. 9B is a detail view of a portion of the non-stick surface of FIG. 9A.

In FIG. 9A, a non-stick surface 72 has a plurality of spaced freely rotating wheels 74, also seen in FIG. 9B. Teflon® coatings may be used with these non-stick surfaces as needed, but is not always necessary.

The distance 40 is set such that the labels 34 can be fed continuously into the pinch point 20 in registration with the second web 42, irrespective of the relative speeds of the first and second webs. The distance is adjustable and determined by the length of the labels 34. If the distance 40 is too great, the label will be completely peeled before it reaches the pinch point and just sit on the non-stick surface 16, without ever contacting the pinch point 20. If the peel point 38 is too close to the pinch point 20, there will still be a large portion of the label in contact with the release liner when the leading edge of the label contacts the pinch point and is pulled between the pinch rollers. Since the target and the label web seldom run at the same speed, this would create a 'tug-o-war' for the label between the peel point and the pinch point, resulting in lost accuracy and possibly damage to the label and/or target. An acceptable distance 40 can be easily ascertained for a particular application, though, by simply adjusting the distance 40 until a good result is obtained.

While the principles of the invention have been described above in connection with specific apparatus and applications, it is to be understood that this description is made only by way of example and not as a limitation on the scope of the invention.

What is claimed is:

1. Continuous motion label transferring apparatus comprising:

a label unwinder, the label unwinder continuously passing a first web along a path towards a pinch point, the first web having a series of spaced labels on a liner of release material, the labels having an adhesive surface to which the liner is releasably attached, a peel bar, along the path of the first web, at a selected distance from the pinch point, the release liner traveling around a peel point on the peel bar, the labels continuing to move toward the pinch point as the web passes the peel point;

a target mover, the target mover passing a succession of equally spaced targets on a second web through the pinch point adjacent the surface of the labels, so that the labels are individually adhered to the targets in the pinch point;

a control system for the label unwinder, the control system monitoring the target mover and synchronizing the labels to the targets in a continuous manner;

wherein the distance between the peel point and the pinch point is such that the labels can be fed continuously into the pinch point in registration with the targets, irrespective of the relative speeds of the labels and targets; and a nonstick surface between the peel point and the pinch point, the adhesive surface of the labels passing directly over the nonstick surface;

wherein the nonstick surface is a plate.

2. The continuous motion label transferring apparatus of claim 1, wherein the targets are pressure-sensitive self-adhesive labels.

* * * * *